(12) United States Patent
Cheng et al.

(10) Patent No.: US 9,028,073 B2
(45) Date of Patent: May 12, 2015

(54) PROJECTION APPARATUS

(75) Inventors: Chuan-Te Cheng, Hsin-Chu (TW); Tao-Hung Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 139 days.

(21) Appl. No.: 13/425,421

(22) Filed: Mar. 21, 2012

(65) Prior Publication Data

US 2013/0003025 A1  Jan. 3, 2013

(30) Foreign Application Priority Data

Jun. 28, 2011  (CN) .......................... 2011 1 0186724

(51) Int. Cl.
*G03B 21/18* (2006.01)
*G03B 21/16* (2006.01)
*G03B 21/00* (2006.01)

(52) U.S. Cl.
CPC .............. G03B 21/16 (2013.01); *G03B 21/008* (2013.01)

(58) Field of Classification Search
CPC ................................. G03B 13/16; G03B 13/18
USPC ......... 353/52, 55, 57–58, 60–61, 69, 85, 122; 362/64, 231, 260, 294, 373; 348/743–747; 349/5, 7–10
See application file for complete search history.

(56) References Cited

U.S. PATENT DOCUMENTS

| | | | |
|---|---|---|---|
| 7,159,991 B2 * | 1/2007 | Ito .................................... | 353/98 |
| 7,976,171 B2 * | 7/2011 | Kameoka et al. ............... | 353/57 |
| 8,500,289 B2 * | 8/2013 | Shibasaki ........................ | 353/84 |
| 2005/0213050 A1 * | 9/2005 | Suzuki ............................ | 353/58 |
| 2006/0132729 A1 | 6/2006 | Engle | |
| 2007/0086075 A1 * | 4/2007 | Takeuchi et al. ............... | 359/227 |
| 2007/0115438 A1 * | 5/2007 | Tsubura .......................... | 353/57 |
| 2007/0182935 A1 * | 8/2007 | Miura ............................. | 353/57 |
| 2009/0051881 A1 * | 2/2009 | Noda .............................. | 353/57 |
| 2009/0161091 A1 * | 6/2009 | Yamamoto ..................... | 356/4.01 |
| 2010/0002199 A1 * | 1/2010 | Hirosawa et al. .............. | 353/57 |
| 2010/0328625 A1 * | 12/2010 | Miyazaki et al. .............. | 353/85 |
| 2011/0019167 A1 * | 1/2011 | Pines et al. ..................... | 355/22 |
| 2011/0304831 A1 * | 12/2011 | Yoshigai ........................ | 353/85 |

FOREIGN PATENT DOCUMENTS

| | | |
|---|---|---|
| CN | 1518682 | 8/2004 |
| CN | 1580942 | 2/2005 |
| CN | 101477291 | 7/2009 |

(Continued)

OTHER PUBLICATIONS

"Office Action of China Counterpart Application", issued on Jun. 4, 2014, p. 1-p. 10, in which the listed references were cited.

*Primary Examiner* — Sultan Chowdhury
(74) *Attorney, Agent, or Firm* — Jianq Chyun IP Office

(57) ABSTRACT

A projection apparatus includes an optical engine base, a light source, a light valve, a lens module, and a fan. The light source is disposed at the optical engine base for emitting an illumination beam. The light valve is disposed at the optical engine base for converting the illumination beam into an image beam. The lens module is disposed at the optical engine base and includes a lens barrel and a lens assembly disposed in the lens barrel for converting the image beam into a projection beam. The fan is disposed at the optical engine base, and adjacent to the lens module. The fan is used for providing an air flow to cool the lens module.

13 Claims, 4 Drawing Sheets

(56) References Cited

FOREIGN PATENT DOCUMENTS

| CN | 102023360 | | 4/2011 |
|---|---|---|---|
| EP | 1065552 | | 1/2001 |
| JP | 07-311420 | | 11/1995 |
| JP | 2010-060884 A | * | 3/2010 |
| TW | I229757 | | 3/2005 |
| TW | 200848779 | | 12/2008 |

* cited by examiner

PROJECTION APPARATUS

CROSS-REFERENCE TO RELATED APPLICATION

This application claims the priority benefit of China application serial no. 201110186724.6, filed on Jun. 28, 2011. The entirety of the above-mentioned patent application is hereby incorporated by reference herein and made a part of this specification.

BACKGROUND OF THE INVENTION

1. Field of the Invention

The invention generally relates to an optical apparatus, and more particularly, to a projection apparatus.

2. Description of Related Art

A projection apparatus is a display apparatus for producing large-size frames. The imaging principle of the projection apparatus is based on converting an illumination beam produced by a light source into an image beam through a light valve, followed by projecting the image beam through lenses onto a screen or a wall to form images. Along with the progress of projection technology and reduction of manufacturing cost thereof, the application of the projection apparatus has been gradually expanded to home purpose from commercial purpose.

A variation of light source luminance or an ambient temperature variation may cause the lenses, the beam-deflecting component used in association with the lenses or other structures in a projection apparatus to have thermal expansion and contraction phenomena, which further leads to a displacement of the focal point of the lenses and accordingly affects projection frames. For example, after turning on a projection apparatus, the temperature therein would gradually rise. At the time, the lenses, the beam-deflecting component or other structures get thermal expansions so that the lenses are unable to precisely focus the light beam at a light valve and thereby, the projection frames gradually become faint, so that a user needs re-focusing to resume normal projection frames. Such re-focusing makes the operation inconvenient and affects the projection quality.

Taiwan Patent No. 1229757 discloses a lens assembly used in projection TV set where a thermal expansion of a structure is utilized to compensate thermal twisting or other optical property variations of the lens components affected by heat. In addition, Taiwan Patent Application Publication No. 200848779 discloses a lens module where a hot bending of a compensation piece is utilized to make a lens barrel move so as to keep the imaging plane of the lens module locating at a predetermined plane.

SUMMARY OF THE INVENTION

Accordingly, the invention is directed to a projection apparatus with better projection quality.

Other objectives and advantages of the invention should be further comprehended from the technical features disclosed in the invention.

To achieve one of, a part of or all of the above-mentioned objectives, or to achieve other objectives, an embodiment of the invention provides a projection apparatus, which includes an optical engine base, a light source, a light valve, a lens module, and a fan. The light source is disposed at the optical engine base for emitting an illumination beam. The light valve is disposed at the optical engine base for converting the illumination beam into an image beam. The lens module is disposed at the optical engine base and includes a lens barrel and a lens assembly, in which the lens assembly is disposed in the lens barrel for converting the image beam into a projection beam. The fan is disposed at the optical engine base and adjacent to the lens module. The fan is used for providing an air flow to cool the lens module.

To achieve one of, a part of or all of the above-mentioned objectives, or to achieve other objectives, an embodiment of the invention provides a projection apparatus, which includes an optical engine base, a light source, a light valve, a lens module, and a motor. The light source is disposed at the optical engine base for emitting an illumination beam. The light valve is disposed at the optical engine base for converting the illumination beam into an image beam. The lens module is disposed at the optical engine base for converting the image beam into a projection beam. The motor is coupled to the lens module, when the temperature of the projection apparatus rises to make the focal point of the lens module displace, the motor adjusts the focal point of the lens module.

To achieve one of, a part of or all of the above-mentioned objectives, or to achieve other objectives, an embodiment of the invention provides a projection apparatus, which includes an optical engine base, a light source, a light valve, a lens module, and at least one focus-adjusting component. The light source is disposed at the optical engine base for emitting an illumination beam. The light valve is disposed at the optical engine base for converting the illumination beam into an image beam. The lens module is disposed at the optical engine base for converting the image beam into a projection beam. A side of the focus-adjusting component is leant against the optical engine base, and another side of the focus-adjusting component is leant against the lens module or the light valve. When the temperature of the projection apparatus rises to make the focal point of the lens module displace, the focus-adjusting component gets thermal deformation to change the distance between the lens module and the light valve so as to adjust the focal point of the lens module.

In the above-mentioned embodiments of the invention, the fan could provide a heat-dissipating air flow to the lens module so as to avoid the lens assembly from overheating to cause displacement of the focal point thereof and further to advance the projection quality. In addition, when the temperature of the projection apparatus rises to make the focal point of the lens module have a displacement, the lens module could be adjusted by using the motor, so that the lens module could fast and correctly focus the beam to keep the clear projection frames. Moreover, the invention could dispose a focus-adjusting component between the lens module and the optical engine base or between the light valve and the optical engine base, and the heat expansion of the focus-adjusting component is utilized to compensate the focal point displacement due to the temperature rising of the projection apparatus and avoid the projection quality from being affected due to the temperature variation of the projection apparatus.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention could be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
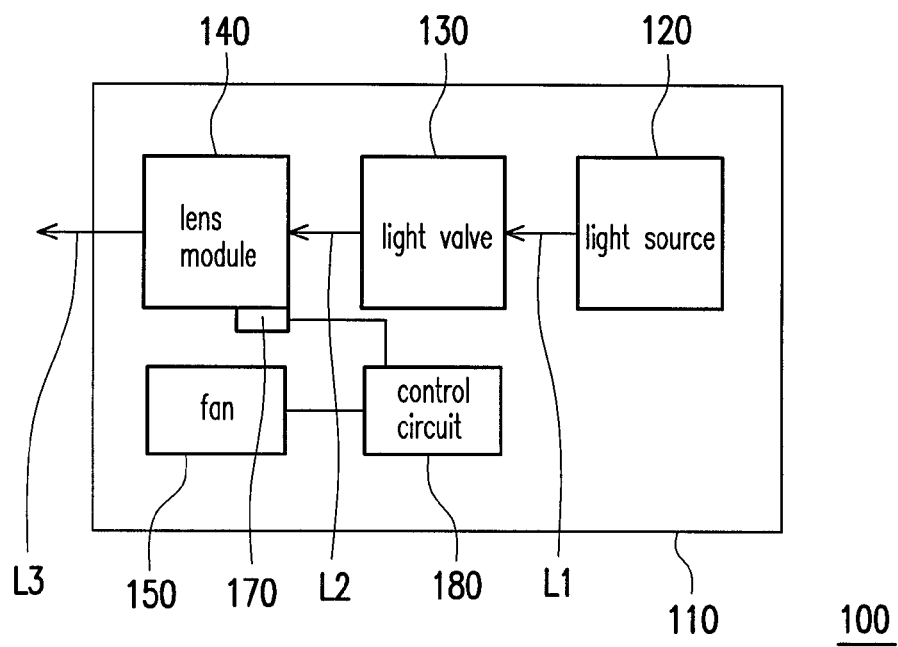
FIG. 1 is a schematic diagram of a projection apparatus according to an embodiment of the invention.

FIG. 1 is a schematic diagram of a projection apparatus according to an embodiment of the invention. Referring to FIG. 1, a projection apparatus 100 of the embodiment includes an optical engine base 110, a light source 120, a light valve 130, a lens module 140, and a fan 150. The light source 120 is disposed at the optical engine base 110 for emitting an illumination beam L1, the light valve 130 is, for example, a digital micro-mirror device (DMD) and disposed at the optical engine base 110 for converting the illumination beam L1 into image beam L2, and the lens module 140 is disposed at the optical engine base 110 for converting the image beam L2 into a projection beam L3.

Figure 2:
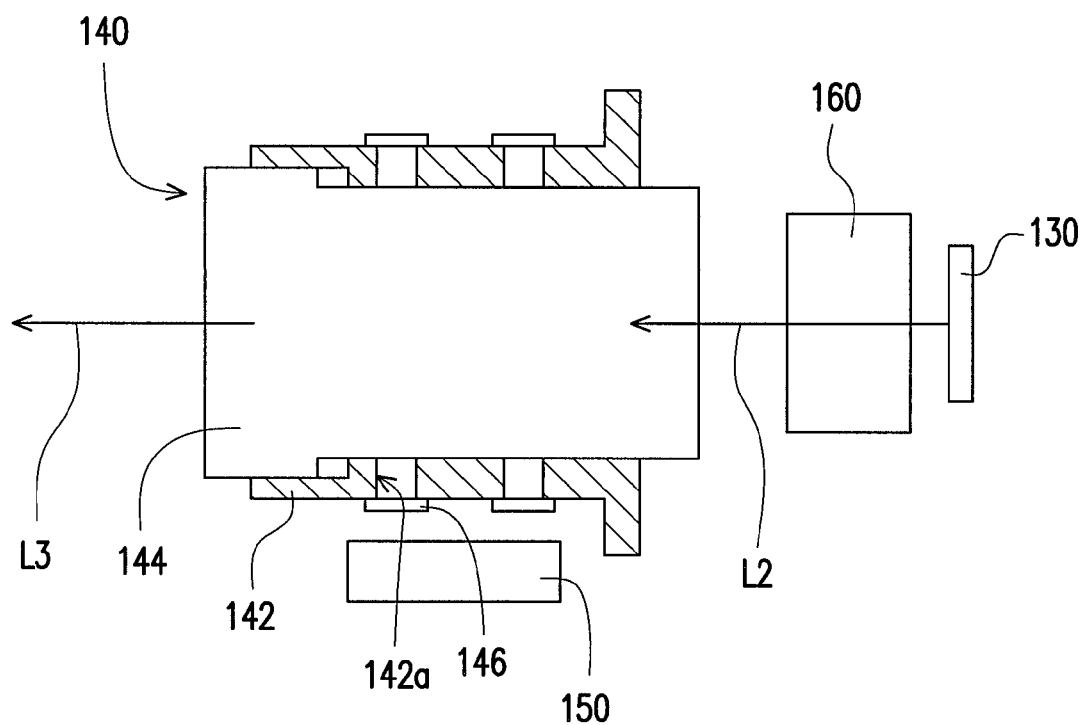
FIG. 2 is a partial diagram of the projection apparatus of FIG. 1.

FIG. 2 is a partial diagram of the projection apparatus of FIG. 1. Referring to FIG. 2, the lens module 140 of the embodiment includes a lens barrel 142 and a lens assembly 144. The lens barrel 142 has at least one opening 142a (multiple ones are shown) and the lens assembly 144 is disposed in the lens barrel 142. The projection apparatus 100 further includes a beam-deflecting component 160 which is disposed between the light valve 130 and the lens module 140. The image beam L2 from the light valve 130 passes the beam-deflecting component 160 and transmits to lens assembly 144. The image beam L2 is converted into the projection beam L3 through the lens assembly 144. The beam-deflecting component 160 herein is, for example, a total internal reflection prism (TIR prism) or a field lens, which the invention is not limited to. As long as an optical component is able to transmit the image beam L2 coming from the light valve 130 to the lens assembly 144, the optical component could serve as the beam-deflecting component 160. In addition, the fan 150 is disposed at the optical engine base 110 so that a heat-dissipating air flow provided by the fan 150 could arrive at the lens assembly 144 through the openings 142a.

With the above-mentioned configuration, since the lens barrel 142 has openings 142a positioned correspondingly to the fan 150, so that the fan 150 could provide a heat-dissipating air flow to the lens assembly 144 through the openings 142a, which avoids the lens assembly 144 from overheating to cause focal point displacement and further advances the projection quality. In more details, the lens assembly 144 of the embodiment is composed of, for example, a plurality of lenses. The openings 142a are respectively positioned correspondingly to some of the above-mentioned lenses with more influence on the projection quality after thermal expansion, which effectively avoids the lens assembly 144 from degrading the quality of projection frames due to the temperature rising Referring to FIG. 2, in the embodiment, the lens module 140 further includes at least one breathable dust-proof membranes 146 (multiple ones are shown). The breathable dust-proof membranes 146 are disposed at the lens barrel 142 and respectively cover the openings 142a to prevent outside dust from contaminating the lens assembly 144 through the openings 142a.

Referring to FIG. 1, in the embodiment, the projection apparatus 100 further includes a temperature sensor 170 and a control circuit 180. The temperature sensor 170 is for sensing a temperature value of the lens module 140. The control circuit 180 is electrically connected to the temperature sensor 170 and the fan 150, and the control circuit 180 is able to control the rotation speed of the fan 150 according to the sensed temperature value. For example, when the temperature of the lens assembly 144 largely rises, the control circuit 180 drives the fan 150 to get a faster rotation speed and provide a massive external air flow into the lens module 140 so as to fast reduce the temperature of the lens module 140; while after the temperature of the lens assembly 144 falls, the control circuit 180 would reduce the rotation speed of the fan 150 or turn off the fan 150 to save the power consumption thereof.

Although the embodiment takes an implementation of disposing the openings 142a on the lens barrel 142 as an example, but the invention does not exclude from the situations other than the above-mentioned implementation, i.e., the invention could also use the fan 150 positioned correspondingly to the lens barrel 142 directly blowing out a cooling air flow to the lens barrel 142 so as to reduce the temperature of the lens module 140.

Figure 3:
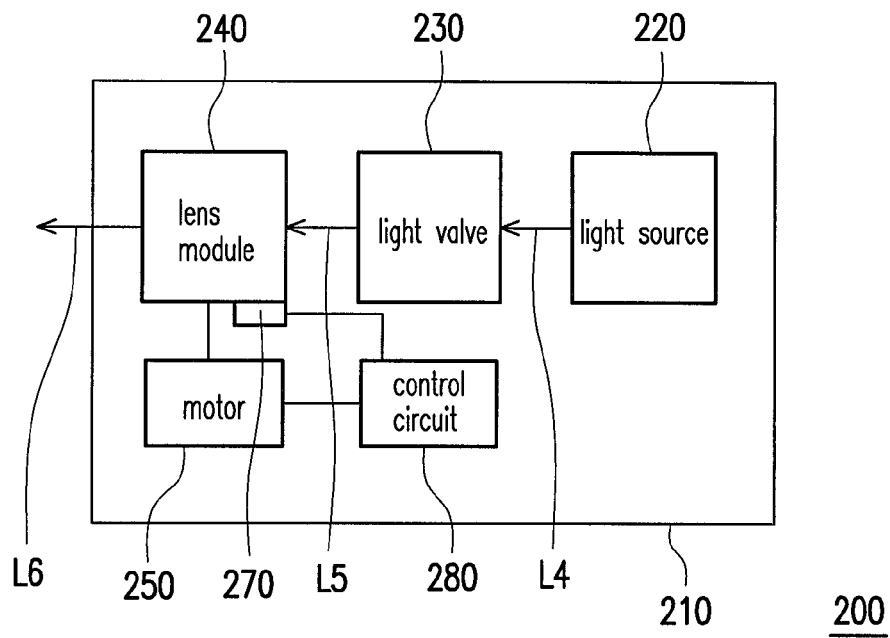
FIG. 3 is a schematic diagram of a projection apparatus according to another embodiment of the invention.

FIG. 3 is a schematic diagram of a projection apparatus according to another embodiment of the invention. Referring to FIG. 3, a projection apparatus 200 of the embodiment includes an optical engine base 210, a light source 220, a light valve 230, a lens module 240, and a motor 250. The light source 220 is disposed at the optical engine base 210 for emitting an illumination beam L4, the light valve 230 is, for example, a DMD and disposed at the optical engine base 210 for converting the illumination beam L4 into an image beam L5, and the lens module 240 is disposed at the optical engine base 210 for converting the image beam L5 into a projection beam L6.

Figure 4:
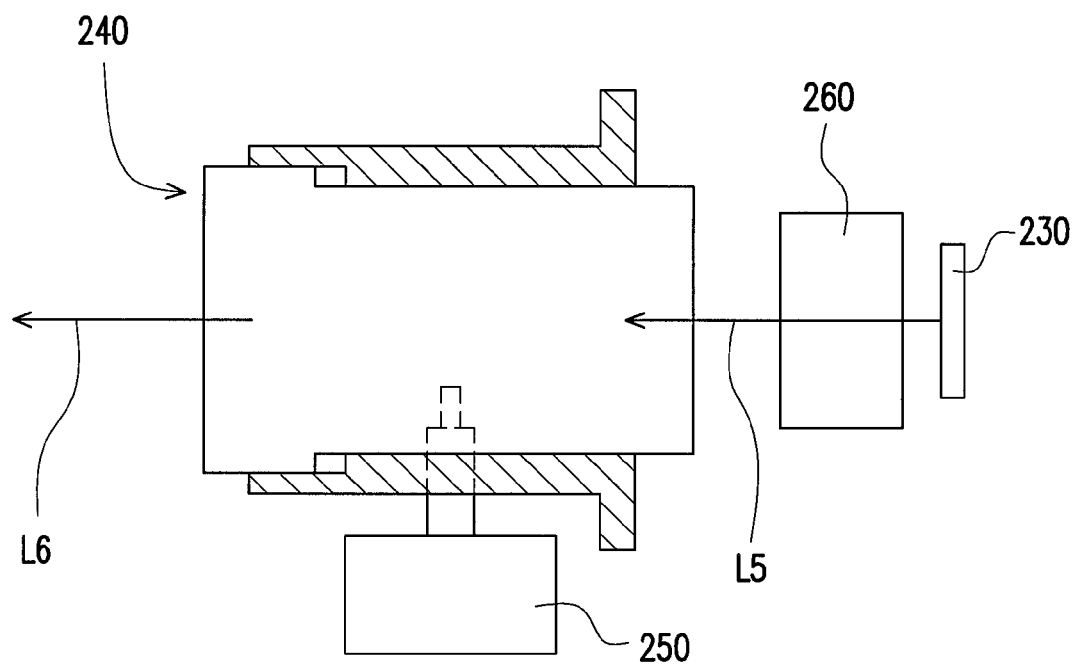
FIG. 4 is a partial diagram of the projection apparatus of FIG. 3.

FIG. 4 is a partial diagram of the projection apparatus of FIG. 3. Referring to FIG. 4, the projection apparatus 200 of the embodiment further includes a beam-deflecting component 260 disposed between the light valve 230 and the lens module 240. The image beam L5 from the light valve 230 passes the beam-deflecting component 260, and transmits to the lens module 240. The image beam L5 is converted into a projection beam L6 after passing through the lens module 240. The motor 250 is coupled to the lens module 240. When the temperature of the projection apparatus 200 rises to make the focal point of the lens module 240 displace, the motor 250 immediately adjusts the lens module 240 such that the lens module 240 fast and correctly focuses to keep clear projection frames.

In more details, referring to FIG. 3, the projection apparatus 200 of the embodiment further includes a temperature sensor 270 and a control circuit 280. The control circuit 280 is electrically connected to the temperature sensor 270 and the motor 250. When the temperature of the projection apparatus 200 rises to make the focal point of the lens module 240 displace, the temperature sensor 270 would sense out a temperature value of the lens module 240. Since the temperature value affects the displacement value of the focal point of the lens module 240, and therefore, the control circuit 280 would drive the motor 250 to adjust the focal point of the lens module 240 according to the temperature value.

The invention does not limit the method for the control circuit 280 to drive the motor 250. In other embodiments, the control circuit 280 could drive the motor 250 according to a displacement value of the focal point of projection frames, in which the displacement value of the focal point of the projection frames could be obtained by experiments in advance. In more details, the displacement value of the focal point of projection frames is varied with the operation time of the projection apparatus 200, which means the operation time of the projection apparatus 200 would affect the displacement value of the focal point of the lens module 240. In this way, the above-mentioned displacement value of the focal point of projection frames is obtained. Therefore, after turning on the projection apparatus 200 or the temperature sensor 270 senses out a rising temperature of the lens module 240, the control circuit 280 automatically adjust the focal point of the lens module 240 according to the displacement value of the focal point of projection frames obtained by experiments in advance.

Figure 5:
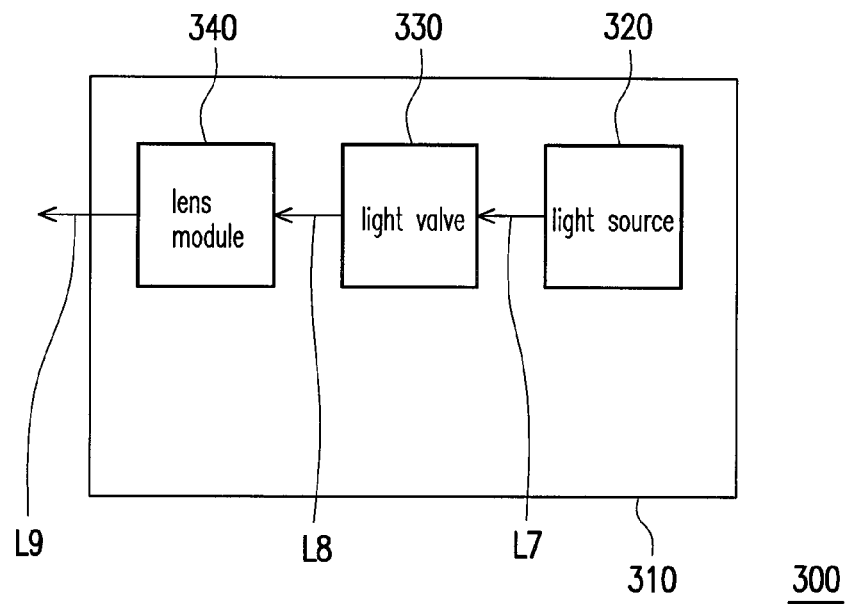
FIG. 5 is a schematic diagram of a projection apparatus according to yet another embodiment of the invention.

FIG. 5 is a schematic diagram of a projection apparatus according to yet another embodiment of the invention. Referring to FIG. 5, a projection apparatus 300 of the embodiment includes an optical engine base 310, a light source 320, a light valve 330, and a lens module 340. The light source 320 is disposed at the optical engine base 310 for emitting an illumination beam L7, the light valve 330 is, for example, a DMD and disposed at the optical engine base 310 for converting the illumination beam L7 into an image beam L8, and the lens module 340 is disposed at the optical engine base 310 for converting the image beam L8 into a projection beam L9.

Figure 6:
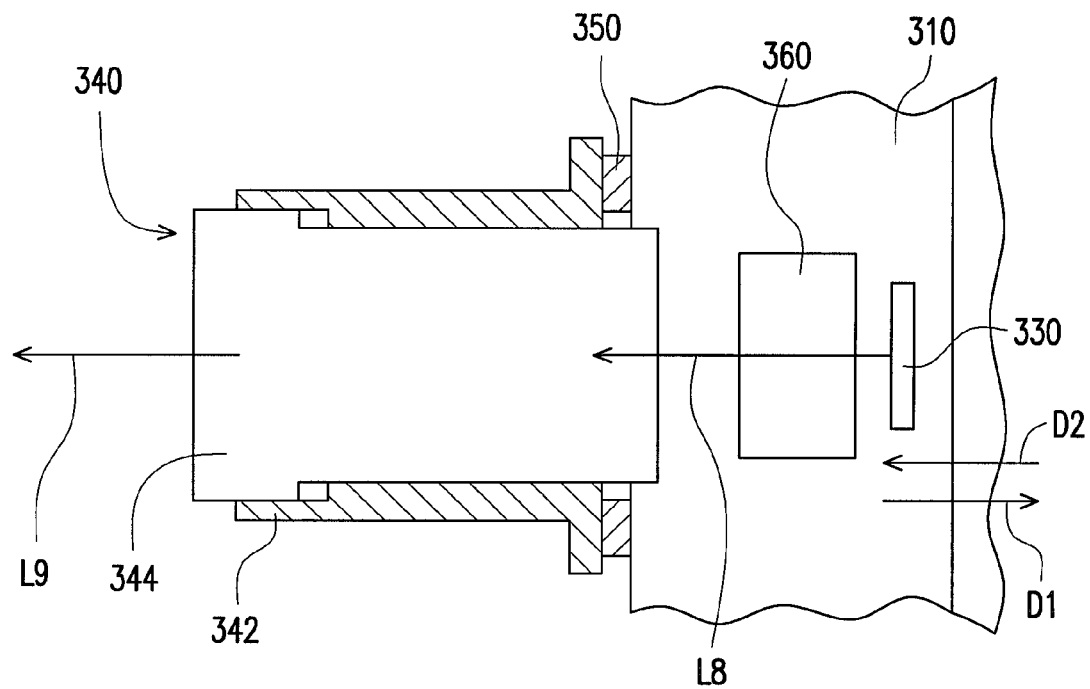
FIG. 6 is a partial diagram of the projection apparatus of FIG. 5.

FIG. 6 is a partial diagram of the projection apparatus of FIG. 5. Referring to FIG. 6, the projection apparatus 300 of the embodiment further includes at least one focus-adjusting component 350 (multiple ones are shown) and a beam-deflecting component 360 disposed between the light valve 330 and the lens module 340. The image beam L8 from the light valve 330 passes the beam-deflecting component 360 and transmits to the lens module 340. The image beam L8 is converted into the projection beam L9 after passing through the lens module 340. A side of the focus-adjusting component 350 is leant against the optical engine base 310, and another side of the focus-adjusting component 350 is leant against the lens module 340. When the temperature of the projection apparatus 300 rises and the focal point of the lens module 340 has a displacement, the focus-adjusting component 350 gets thermal deformation to change the distance between the lens module 340 and the light valve 330 so as to adjust the focal point of the lens module 340. The heat expansion of the focus-adjusting component 350 is utilized to compensate the focal point displacement due to the rising temperature of the projection apparatus 300. In this way, the projection quality affected by the temperature variation of the projection apparatus 300 could be avoided.

Figure 7:
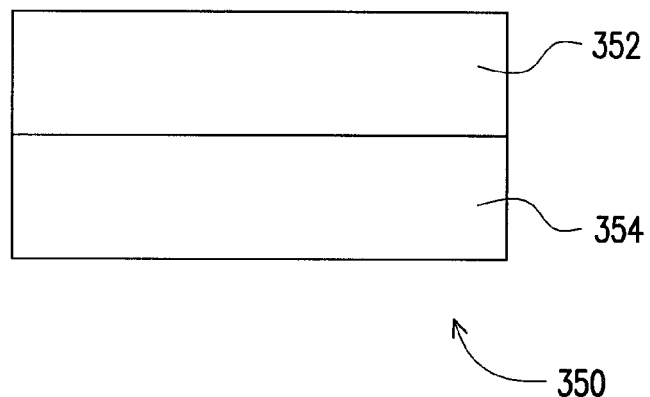
FIG. 7 is a schematic diagram of a focus-adjusting component of FIG. 6.

FIG. 7 is a schematic diagram of the focus-adjusting component 350 of FIG. 6. Referring to FIG. 7, in the embodiment, the focus-adjusting component 350 is composed of, for example, a first metal plate 352 and a second metal plate 354 laminated with the first metal plate 352, in which the coefficient of thermal expansion (CTE) of the second metal plate 354 is different from the CTE of the first metal plate 352. When the focus-adjusting component 350 is heated, the first metal plate 352 and second metal plate 354 respectively have different thermal expansion extents to cause the focus-adjusting component 350 to get a bending deformation, which further brings the lens module 340 moving so as to compensate the displacement of the focal point due to the rising temperature.

In more details, when the lens module 340 of the embodiment is heated, the focal length thereof is increased so as to make the focal point move along a direction D1 away from the light valve 330. At the time, the focus-adjusting component 350 also gets a thermal deformation to push the lens module 340 moving along a direction D2, which makes the focal point move back to the place where the light valve 330 is located along the direction D2 so as to resume correct focusing.

Figure 8:
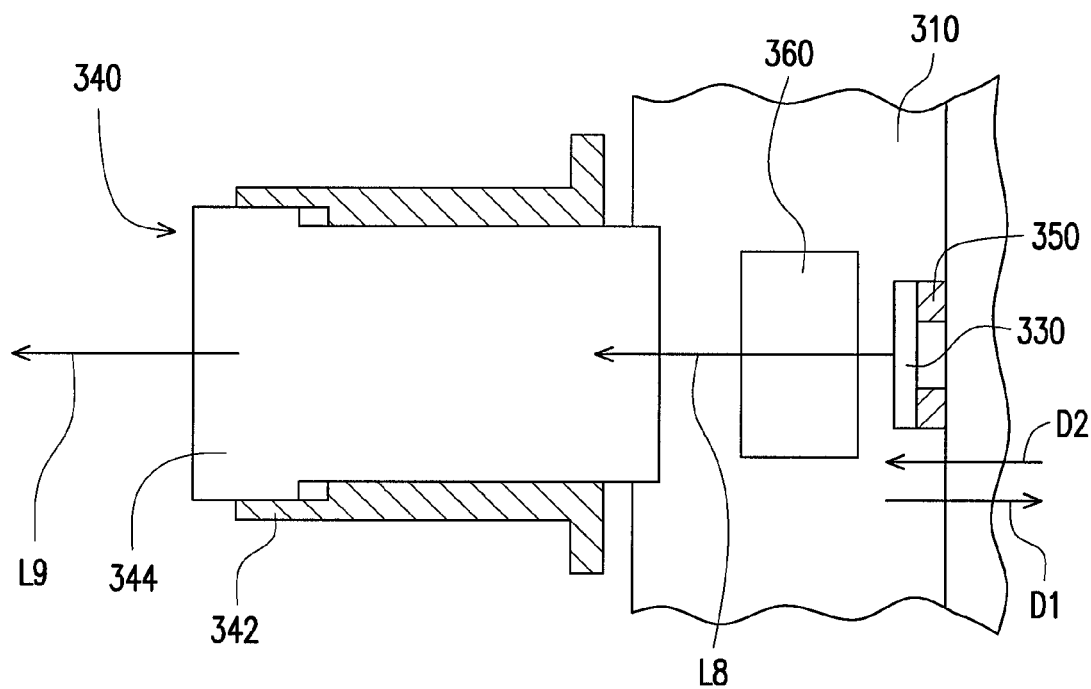
FIG. 8 is a schematic diagram showing the focus-adjusting component of FIG. 6 disposed between the light valve and the optical engine base.

FIG. 8 is a schematic diagram showing the focus-adjusting component of FIG. 6 disposed between the light valve and the optical engine base. Referring to FIG. 8, if the focal length of the lens module 340 is decreased under heat, the focal point moves along the direction D2 away from the light valve 330. In such situation, the above-mentioned layout in FIG. 6 could be modified that the focus-adjusting component 350 is disposed between the light valve 330 and the optical engine base 310 and leant against the light valve 330 and the optical engine base 310. In this way, the focus-adjusting component 350 deformed by rising temperature would push the light valve 330 along the direction D2 to the place where the focal point of the lens module 340 is located so as to resume correct focusing.

In summary, in the above-mentioned embodiments of the invention, the lens barrel has openings correspondingly to the fan and the fan could provide a heat-dissipating air flow to the lens assembly through the openings so as to avoid the lens assembly from overheating to cause displacement of the focal point thereof and further to advance the projection quality. In addition, when the temperature of the projection apparatus rises to make the focal point of the lens module displace, the lens module could be adjusted by using the motor, such that the lens module could be fast and correctly focus to keep the clear projection frames. Moreover, a focus-adjusting component could be disposed between the lens module and the optical engine base or between the light valve and the optical engine base, and the heat expansion of the focus-adjusting component is utilized to compensate the focal point displacement due to the rising temperature of the projection apparatus and avoid the projection quality from being affected due to the temperature variation of the projection apparatus.

The foregoing description of the preferred embodiments of the invention has been presented for purposes of illustration and description. It is not intended to be exhaustive or to limit the invention to the precise form or to exemplary embodiments disclosed.

Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection apparatus, comprising:
   an optical engine base;
   a light source, disposed at the optical engine base for emitting an illumination beam;
   a light valve, disposed at the optical engine base for converting the illumination beam into an image beam;
   a lens module, disposed at the optical engine base and comprising:
      a lens barrel; and
      a lens assembly, disposed in the lens barrel for converting the image beam into a projection beam;
   a fan, disposed at the optical engine base and adjacent to the lens module, the fan used for providing an air flow to cool the lens module directly, wherein the lens barrel further comprises at least one opening disposed at the optical engine base, and the air flow flows to the lens assembly through the opening;
   a temperature sensor for sensing a temperature value of the lens module; and
   a control circuit, electrically connected to the temperature sensor and the fan and controlling a rotation speed of the fan according to the temperature value.

2. The projection apparatus as claimed in claim 1, wherein the lens assembly comprises a plurality of lenses and the opening is positioned correspondingly to one of the lenses.

3. The projection apparatus as claimed in claim 1, wherein the lens module further comprises at least one breathable dust-proof membrane disposed at the lens barrel and covering the opening.

4. The projection apparatus as claimed in claim 1, wherein the light valve is a digital micro-mirror device (DMD).

5. The projection apparatus as claimed in claim 1, further comprising a beam-deflecting component, wherein the beam-deflecting component is disposed between the light valve and the lens module, and the image beam transmits to the lens module after passing through the beam-deflecting component.

6. A projection apparatus, comprising:
   an optical engine base;
   a light source, disposed at the optical engine base for emitting an illumination beam;
   a light valve, disposed at the optical engine base for converting the illumination beam into an image beam;
   a lens module, disposed at the optical engine base for converting the image beam into a projection beam;
   a motor, coupled to the lens module, wherein when the temperature of the projection apparatus rises to make the focal point of the lens module displace corresponding to the light valve, the motor adjust the focal point of the lens module corresponding to the light valve;
   a temperature sensor; and
   a control circuit, electrically connected to the temperature sensor and the motor, wherein when the temperature of the projection apparatus rises to make the focal point of the lens module displace, the temperature sensor senses a temperature value of the lens module and the control circuit drives the motor to adjust the focal point of the lens module according to the temperature value.

7. The projection apparatus as claimed in claim 6, further comprising a control circuit, wherein the control circuit is electrically connected to the motor, when the temperature of the projection apparatus rises to make the focal point of the lens module displace, the control circuit drives the motor to adjust the focal point of the lens module according to a displacement value of the focal point of a projection frame.

8. The projection apparatus as claimed in claim 6, wherein the light valve is a digital micro-mirror device (DMD).

9. The projection apparatus as claimed in claim 6, further comprising a beam-deflecting component, wherein the beam-deflecting component is disposed between the light valve and the lens module, and the image beam transmits to the lens module after passing through the beam-deflecting component.

10. A projection apparatus, comprising:
    an optical engine base;
    a light source, disposed at the optical engine base for emitting an illumination beam;

a light valve, disposed at the optical engine base for converting the illumination beam into an image beam;

a lens module, disposed at the optical engine base for converting the image beam into a projection beam; and at least one focus-adjusting component, wherein a side of the focus-adjusting components is leant against the optical engine base, and another side of the focus-adjusting components is leant against the lens module or the light valve, when the temperature of the projection apparatus rises and the focal point of the lens module displaces, the focus-adjusting components gets thermal deformation to change the distance between the lens module and the light valve so as to adjust the focal point of the lens module.

11. The projection apparatus as claimed in claim 10, wherein the focus-adjusting component comprises:

a first metal plate; and a second metal plate, laminated with the first metal plate, wherein the coefficient of thermal expansion (CTE) of the second metal plate is different from the coefficient of thermal expansion of the first metal plate.

12. The projection apparatus as claimed in claim 10, wherein the light valve is a digital micro-minor device (DMD).

13. The projection apparatus as claimed in claim 10, further comprising a beam-deflecting component, wherein the beam-deflecting component is disposed between the light valve and the lens module, and the image beam transmits to the lens module after passing through the beam-deflecting component.

* * * * *